(No Model.)
E. WESTON.
DYNAMO ELECTRIC MACHINE.
No. 301,025. Patented June 24, 1884.
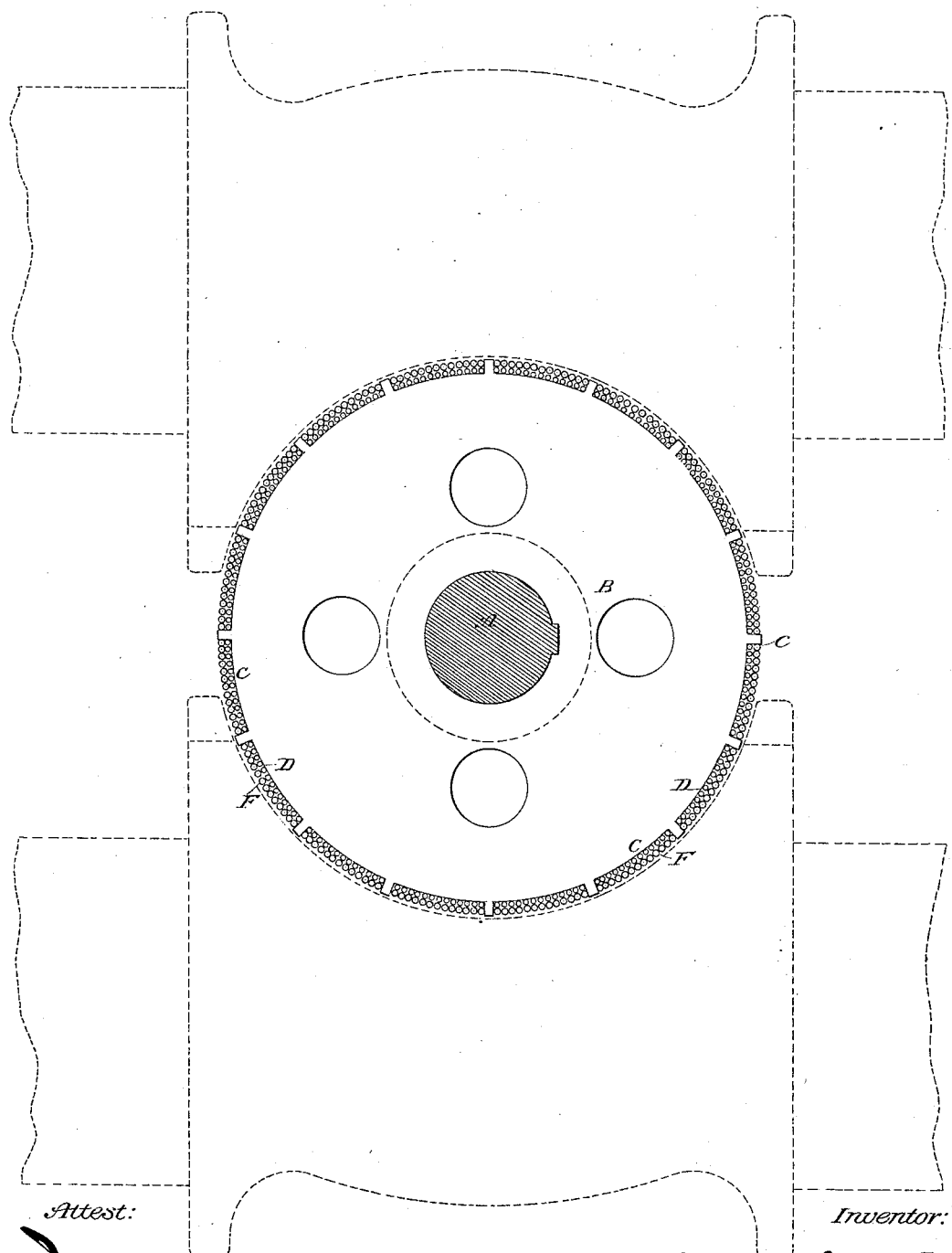
Attest: Inventor:
Raymond H. Barnes. Edward Weston
W. H. Dogget. By Parker W. Page atty.

United States Patent Office.

EDWARD WESTON, OF NEWARK, NEW JERSEY, ASSIGNOR TO THE UNITED STATES ELECTRIC LIGHTING COMPANY, OF NEW YORK, N. Y.

DYNAMO-ELECTRIC MACHINE.

SPECIFICATION forming part of Letters Patent No. 301,025, dated June 24, 1884.

Application filed December 29, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Dynamo-Electrical Machines, of which the following is a specification, reference being had to the drawing accompanying and forming a part of the same.

My improvements relate to dynamo or magneto electric machines and motors of that class which have annular or cylindrical armatures upon which the coils are wound from side to side, or, in other words, upon the sides and ends of the core. In such machines as heretofore constructed the conductors have been wound upon the surface of the cylinder or annulus, and also in grooves or recesses formed therein. In the former case, if more than one layer of wire is used, spaces will occur between the convolutions of the outer layers, provided that the number of convolutions in each layer be the same. This has been avoided by making the grooves rectangular. My invention is an improvement on this plan of constructing the armature. According to my invention I form a core with sectoral recesses, or such as decrease in width in proportion to their depth, and in the recesses I wind the coils as before, using, however, conductors of greater diameter for the successive layers. In this way I inclose the efficiency of the machine by increasing the amount of active conductor and lowering the resistance of the armature-circuit.

I will describe my invention as applied to a system of winding described by me in a former patent, No. 209,532. From the nature of the case, however, it is evident that the invention is applicable to other systems of winding, and to armatures of this type generally, whether the same contain grooves or not.

The drawing is a section of an armature at right angles to the axis.

A is the shaft; B, one of the plates which are strung upon the shaft to form the core. C C are the sectoral grooves or recesses in which the coils are laid. These grooves are readily formed by punching out parts of the plates before they are assembled. In winding the armature the under coils, as D, are first formed with a conductor of given diameter, and the outer coils, as F, are then wound over the first. A conductor of slightly greater diameter is, however, used for the outer coils, E, so that the spaces in the grooves may be completely filled. When the winding is completed, the coils are connected together and to the commutator in the usual way. When more than two layers of wire are used, the same plan of using larger wires for successive layers is followed, the results being practically the same, whether the wires be wound in grooves or not.

As above stated, the invention is applicable to any armature of the type exhibited in the drawing—that is to say, cylindrical or disk-shaped armatures, whether solid or continuous or not.

What I claim is—

1. The combination, with an armature-core of the kind described, of coils wound thereon, the layers of which are composed of conductors of a diameter proportional to their distance from the center of the core, as set forth.

2. The combination, with a cylindrical core containing sectoral grooves or recesses, of coils wound in the grooves, the layers of which are composed of conductors of a diameter proportional to their distance from the center of the core, as set forth.

In testimony whereof I have hereunto set my hand this 21st day of December, 1883.

EDWARD WESTON.

Witnesses:
HENRY S. LOWE,
R. W. BLOEMEKE.